April 13, 1937. J. H. NASH 2,077,003
WATER SOFTENING APPARATUS
Filed Feb. 21, 1936
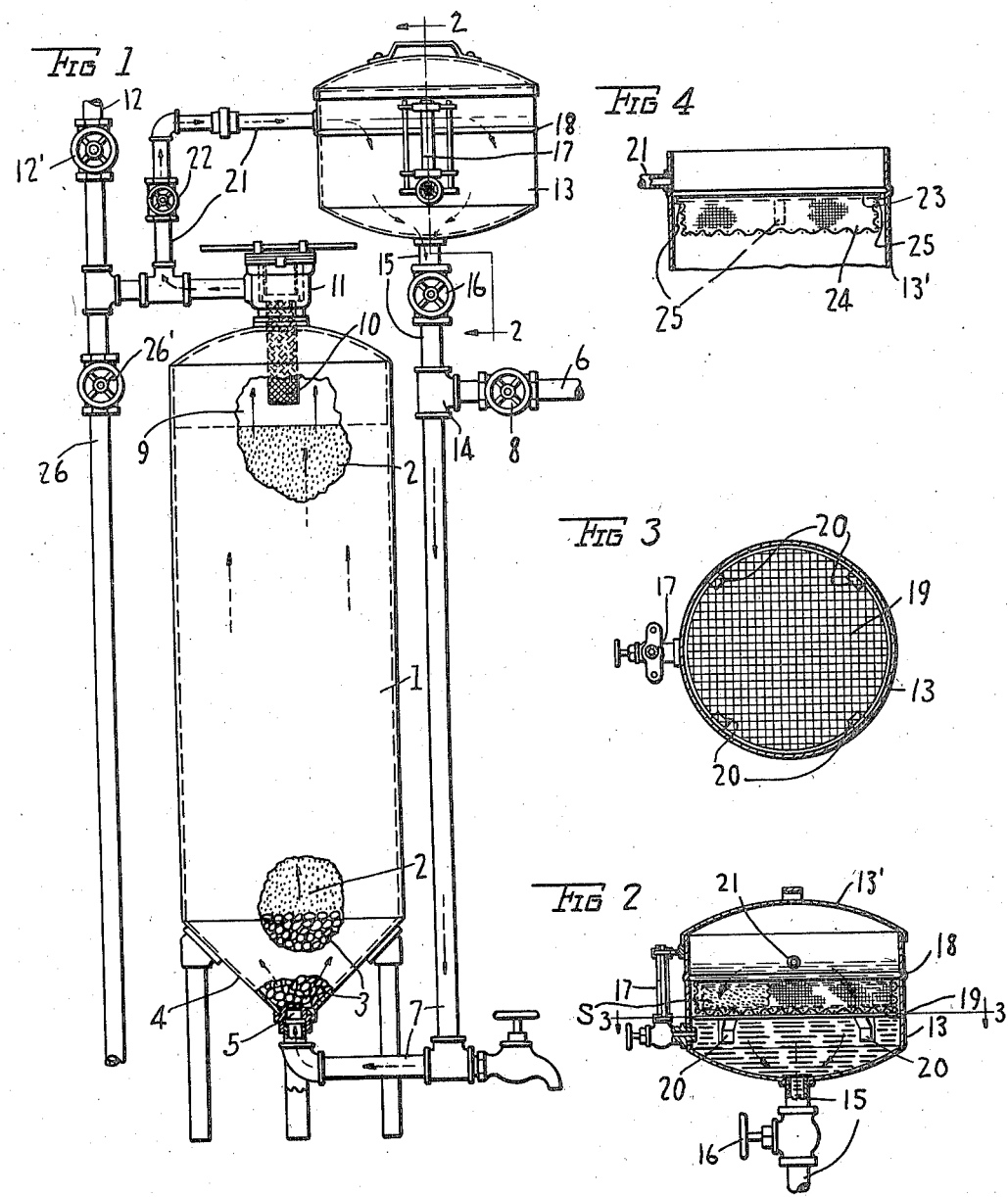

Patented Apr. 13, 1937

2,077,003

UNITED STATES PATENT OFFICE 2,077,003

WATER SOFTENING APPARATUS

John H. Nash, Dayton, Ohio

Application February 21, 1936, Serial No. 65,098

1 Claim. (Cl. 210—24)

This invention relates to improvements in base exchange water softeners, it more particularly relating to provisions whereby a circulatory flow of brine through the mineral bed is set up as the brine begins to form.

One of the objects of the invention is to provide means whereby the time of preparing the brine and effecting a regeneration is reduced. This feature is explained by stating that in other softening systems the brine is prepared in the saturator to its full strength before it is allowed to enter and flow through the mineral bed where the coating on the granules is dissolved. In the present invention regeneration starts practically as soon as formation of brine begins as will be explained.

Another object of the invention is to provide a saturator of the improved type which will most readily lend itself to conversion jobs, that is, the means whereby the circulatory flow is set up is easily applied to prior necessarily non-circulating systems so as to provide the better circulating flow. By conversion it is often found that instead of throwing away a mineral bed which apparently has lost its regenerative ability that capacity is recovered and that such beds give perfect service when the circulating flow system is employed.

In the accompanying drawing:

Fig. 1 is an elevation with broken-away portions of a water softener in which the principles of the invention are embodied.

Fig. 2 is a vertical section on the line 2—2 of Fig. 1.

Fig. 3 is a horizontal section on the line 3—3 of Fig. 2.

Fig. 4 is a vertical section in fragmentary form of a modification.

Referring to the drawing, 1 represents a tank containing the bed of exchange material 2 which may be zeolite or any of the commonly used exchange materials. The mineral bed 2 is supported on the gravel bed 3 which acts as a diffuser for the water to be softened before entering the mineral bed, the lower portion 4 of the tank 1 being hopper-shaped to aid in diffusion. The hard water enters the diffuser bed 3 through the nozzle 5 which is connected to the service pipe 6 through the piping 7, so that on actuating the valve 8, the hard water from the service pipe flows into and rises upwardly through the mineral bed and there gives up to the mineral grains the lime, magnesium and other constituents which produce hardness in the water.

Above the mineral is what is known as the free-board indicated at 9, in which space is stored the softened water after having passed through the mineral bed. The outlet from the softener tank 1 is through the screen 10 and outwardly through the filter device 11 and thence to the house pipe 12 through a valve 12'. The discharge to the sewer is through the valve 26' to the pipe 26.

The saturator in which the salt is placed is a comparatively short tank 13 placed above the level of the softener tank 1 in order to utilize the force of gravity in establishing the circulatory flow of brine. By means of the T 14 the saturator is connected to the service pipe 6 by a short length of pipe 15 in which a valve 16 is interposed so as to obtain water from the service pipe from which to form brine, and is also connected to the pipe 7 therebelow leading to the lower end of the mineral bed.

There is provided a salt support 19 (Fig. 3) which in the present case is merely a disk-like member of woven wire mesh to allow circulation therethrough. This support rests on small brackets 20 attached to the inner surface of the side wall of the saturator tank 13, and, since with the present system, there is no need of storing quantities of brine, the support 19 may be placed comparatively close to the bottom of the tank, making it possible to use a short tank. The height of the tank depends first on the amount of salt that will be used at a regeneration (this amount depending on the size of the softener) and, second, on the amount of water over the salt, it being preferred in the present system that the salt be submerged. Obviously, the top of the tank 13 is open, and a cover 13' is provided to close the tank. The water level in the tank 13 is visible in the sight gauge glass 17 and the proper level is indicated by a mark 18 which in the present case is an annular bead roller on the side wall of the tank.

The circulatory flow of brine is allowed for by providing a pipe connection from the upper part of the softener tank 1 and the upper part of the saturator tank 13. Specifically, this pipe connection is a pipe 21 leading from the house pipe at a point intermediate the softener tank 1 and the house pipe valve 12' with a valve 22 in the pipe 21 so that with the valve 22 opened and the valves 12' and 26' closed, the course of water from the softener 1 is to the saturator only.

When it is desired to effect a regeneration, salt preferably in fabric bags in the proper measured quantities is placed on the salt support 19 in the saturator tank 13. The house pipe valve 12' is closed and the valves 16 and 22 are opened, allowing water from the service pipe 6 to flow through the opened service pipe valve 8 into the saturator tank 13 until the proper level 18 is reached, and as stated before, this amount of water will cover the salt. When the level is reached, the service pipe valve 8 is closed, leaving the valve 16 opened so as to provide that the flow of brine which starts as soon as the fresh water touches the salt will have access through the pipe 7 to the mineral bed.

When regeneration has been completed, a valve 26' is opened, allowing the contents of the softener, consisting of brine and the dissolved hardness producing materials to flow to the sewer through the pipe 26. To flush the system, the water valve 8 is opened for a time, and when softened water shows at the end of the pipe 26, the valves 26' and 22 are closed and the house pipe valve is opened, thereby returning the softener to service.

This downward flow of brine, however weak it may be at first, is shown by the arrows in the pipe 7. The fresh water present in the pipe 7 at the start of the flow is displaced and is pushed ahead by the brine which eventually enters the mineral bed, and all the water there in the interstices is forced upwardly, passing along with the fresh water in the free-board space, further upwardly and entering the saturator tank 13 near its upper end where the pipe 21 connects into the saturator tank. The upward flow of the fresh water is shown by arrows in the softener tank and pipe 21, it being understood that as the process continues and brine of greater strength is made, that these same arrows taken with the other arrows shown in Fig. 1, indicate the circulatory flow of brine.

It will be understood that by experiment the amount of salt sufficient for a regeneration may be determined and that amount placed in the saturator, and that so long as salt remains undissolved in the saturator tank, it is evidence that the process of regeneration should be allowed to continue until all the salt is dissolved into brine. It will be understood further, however, that the time is not unduly long, nor as long as compared with non-circulatory systems, because with the present system of circulatory flow, regeneration starts as soon as the flow begins.

In Fig. 4 there is shown a modification in the form of salt supporting means. In the form shown in Figs. 2 and 3, the salt, without removal from the fabric bags, is placed in the saturator tank on the wire mesh support 19, as described, but in the support shown in Fig. 4, there is provided a metallic ring 23 to which is fastened a fabric bag 24 into which loose salt may be placed. The ring rests on brackets 25 attached to the inner side wall of the tank, and with this form also, all of the salt is covered by water.

Having thus described my invention, I claim:

In a water softening apparatus, a mineral tank, a brine receptacle, a salt support in said brine receptacle, a pipe leading from the lower end of said brine receptacle to the lower end of said mineral tank, a service pipe connected with said first mentioned pipe, a valve for controlling the same, a valve in said first mentioned pipe between the brine receptacle and said service pipe, a house pipe leading from the upper end of said mineral tank, a valve for controlling the same, a drain pipe connected with said house pipe, a valve for controlling the same, and a pipe leading from said house pipe to said brine receptacle and entering the same above said salt support, said last mentioned pipe being located between the mineral tank and the drain pipe and the valve which controls the house pipe.

JOHN H. NASH.